United States Patent
Shi et al.

(10) Patent No.: US 12,063,531 B2
(45) Date of Patent: Aug. 13, 2024

(54) SIGNAL REPORTING METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Zhihua Shi, Guangdong (CN); Wenhong Chen, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 745 days.

(21) Appl. No.: 17/165,637

(22) Filed: Feb. 2, 2021

(65) Prior Publication Data

US 2021/0160716 A1    May 27, 2021

Related U.S. Application Data

(63) Continuation of application No. PCT/CN2018/099560, filed on Aug. 9, 2018.

(51) Int. Cl.
*H04W 24/10* (2009.01)
*H04B 17/318* (2015.01)
(Continued)

(52) U.S. Cl.
CPC .......... *H04W 24/08* (2013.01); *H04B 17/318* (2015.01); *H04L 5/0048* (2013.01); *H04W 24/10* (2013.01)

(58) Field of Classification Search
CPC .................................................... H04W 24/10
See application file for complete search history.

(56) References Cited

U.S. PATENT DOCUMENTS

2017/0013631 A1*  1/2017  Takahashi ............. H04L 5/0048
2017/0230780 A1   8/2017  Chincholi et al.
(Continued)

FOREIGN PATENT DOCUMENTS

| CN | 108604949 A | 9/2018 |
| WO | 2017136666 A1 | 8/2017 |
| WO | 2018088538 A1 | 5/2018 |

OTHER PUBLICATIONS

Ericsson "Change Request: Introduction of SA" R2-1810388; 3GPP TSG-WG2 Meeting #102AH; Montreal, Canada, Jul. 2-6, 2018. 428 pages. (Year: 2018).*

(Continued)

*Primary Examiner* — Benjamin Lamont
(74) *Attorney, Agent, or Firm* — PERKINS COIE LLP

(57) ABSTRACT

A signal reporting method, a terminal device and a network device. The terminal device can be configured to measure a reporting volume other than that of L1-RSRP, so as to facilitate the flexible measurement of signals and to improve the reliability of signal selection. The method comprises: a terminal device determining signals under measurement used for signal measurement according to resource allocation information; the terminal device measuring a first reporting volume of the signals under measurement to obtain a measurement result of the first reporting volume of the signals under measurement, wherein the first reporting volume comprises reporting volumes other than that of the L1-RSRP (Layer 1-reference signal received power); the terminal device determining a signal that needs to be reported in the signals under measurement according to the measurement result of the first reporting volume of the signals under measurement.

10 Claims, 3 Drawing Sheets

(51) Int. Cl.
*H04L 5/00* (2006.01)
*H04W 24/08* (2009.01)

(56) References Cited

U.S. PATENT DOCUMENTS

| | | | | |
|---|---|---|---|---|
| 2018/0219664 | A1* | 8/2018 | Guo | H04W 24/10 |
| 2018/0279145 | A1* | 9/2018 | Jung | H04L 5/0051 |
| 2018/0323886 | A1* | 11/2018 | Yi | H04B 17/336 |
| 2019/0261347 | A1* | 8/2019 | Harada | H04W 72/21 |
| 2020/0014428 | A1* | 1/2020 | Chen | H04B 7/024 |
| 2020/0021336 | A1* | 1/2020 | Da Silva | H04W 36/0094 |
| 2020/0120525 | A1* | 4/2020 | da Silva | H04W 52/241 |
| 2021/0119680 | A1* | 4/2021 | Matsumura | H04W 80/02 |

OTHER PUBLICATIONS

Final Rejection for Taiwanese Application No. 108128389 issued Dec. 6, 2022. 3 pages with English translation.
3GPP TS 38.215 V15.2.0 (Aug. 2017)—3rd Generation Partnership Project; Technical Specification Group Radio Access Network; NR; Physical layer measurements (15 pages). (Release 15).
International Search Report mailed May 9, 2019 of PCT/CN2018/099560 (4 pages).
Examination Report for Indian Application No. 202127008806 issued Jan. 21, 2022. 8 pages with English translation.
Notice of Reasons for Refusal for Japanese Application No. 2021-504510 issued Sep. 2, 2022. 8 pages with English translation.
Office Action for Taiwanese Application No. 108128389 issued Aug. 16, 2022. 22 pages with English translation.
First Office Action of the Chinese application No. 202210262488.X, issued on Jun. 9, 2023. 15 pages with English translation.
Decision of Refusal for Japanese Application No. 2021-504510 issued Mar. 24, 2023. 4 pages with English translation.
Examination Report for European Application No. 18929606.4 issued Mar. 14, 2023. 8 pages.
EPO, Extended European Search Report for European Application No. 18929606.4. Mail Date: Jul. 6, 2021. 12 pages.
Ericsson "On RSSI related parameter configuration in SIBs" Tdoc R2-1806796; 3GPP TSG-RAN WG2 #102; Busan, S. Korea, May 21-25, 2018. 6 pages.
Huawei "Summary of discussion on mobility evaluation method and parameters" R1-1805643; 3GPP TSG RAN WG1 Meeting #92bis; Sanya, China, Apr. 16-20, 2018. 5 pages.
Nokia et al. "Measurements for mobility management" R1-1720884; 3GPP TSG-RAN WG1 meeting #91; Reno, Nevada, USA; Nov. 27-Dec. 1, 2017. 21 pages.
NTT Docomo, Inc. "Remaining details on measurement for mobility management" R1-1720796; 3GPP TSG RAN WG1 Meeting #91; Reno, USA, Nov. 27-Dec. 1, 2017. 9 pages.
Second Office Action of the Japanese application No. 2021-504510, issued on Sep. 29, 2023. 6 pages with English translation.
Second Office Action of the Chinese application No. 202210262488.X, issued on Aug. 31, 2023. 16 pages with English translation.
Hearing Notice of the Indian application No. 202127008806, issued on Dec. 29, 2023. 2 pages.

* cited by examiner

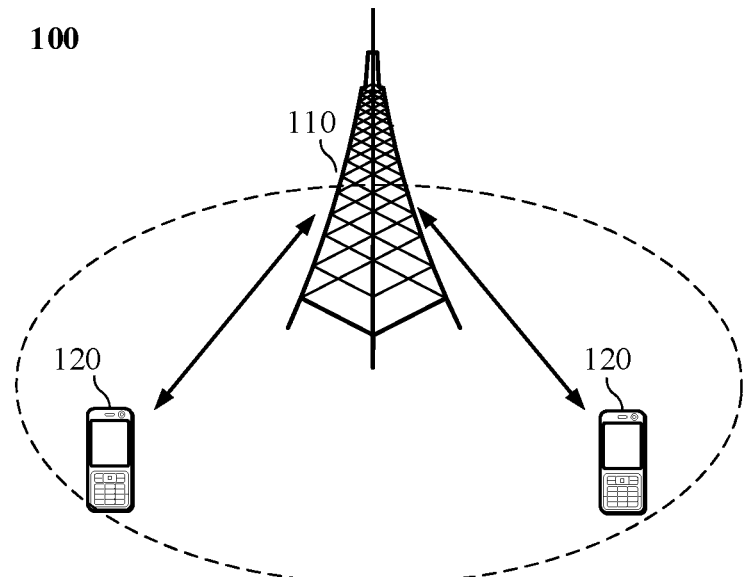

A terminal device determines a signal to be measured for signal measurement according to resource configuration information — S210

The terminal device measures a first report quantity of the signal to be measured to obtain a measurement result for the first report quantity of the signal to be measured, wherein the first report quantity includes other report quantities except a Layer1-Reference Signal Receiving Power (L1-RSRP) — S220

The terminal device determines a signal to be reported in the signal to be measured according to the measurement result for the first report quantity of the signal to be measured — S230

A network device sends resource configuration information to a terminal device, wherein the resource configuration information is used for the terminal device to determine a signal to be measured for signal measuring to measure a first report quantity of the signal to be measured, and obtain a measurement result for the first report quantity of the signal to be measured, wherein the first report quantity includes other report quantities except a Layer 1-Reference Signal Receiving Power (L1-RSRP) ⟵ S310

The network device receives a report result sent by the terminal device, wherein the report result includes information of a signal determined by the terminal device in the signal to be measured according to the measurement result for the first report quantity of the signal to be measured ⟵ S320

FIG. 3

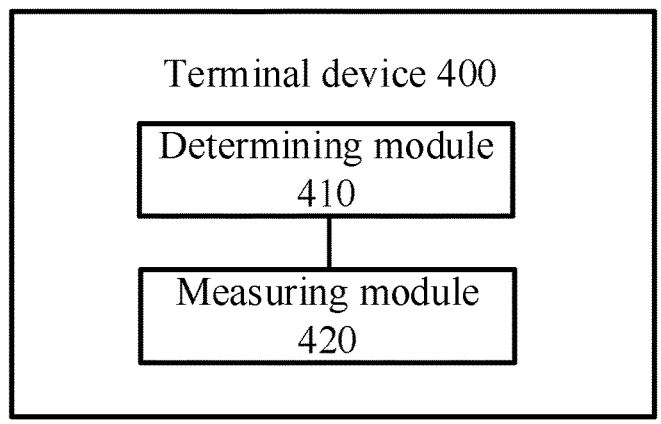

FIG. 4

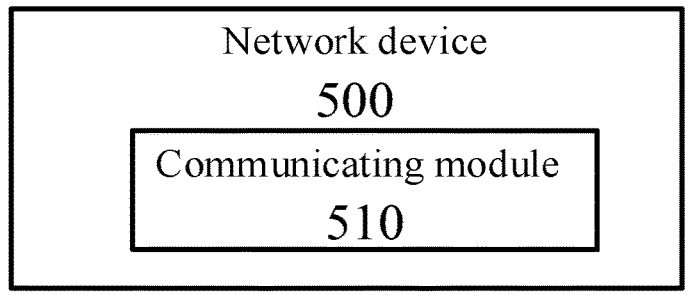

FIG. 5

SIGNAL REPORTING METHOD, TERMINAL DEVICE, AND NETWORK DEVICE

CROSS-REFERENCE TO RELATED APPLICATION

This application is a continuation application of International Application No. PCT/CN2018/099560, filed on Aug. 9, 2018, the entire disclosure of which is hereby incorporated by reference.

TECHNICAL FIELD

Implementations of the present disclosure relate to the field of communication, specifically to a method for reporting a signal, a terminal device and a network device.

BACKGROUND

In a 5G multi-beam system, a terminal device may measure a Layer1-Reference Signal Receiving Power (L1-RSRP) of multiple signals, and determine which beams have a better transmission quality based on a measurement result, or beams transmitting these signals have a better transmission quality, so that the terminal device may report information of these signals, such as beam information or the measurement result, to a network device.

However, the measurement mode based on the L1-RSRP is too simple, and in some cases, a quality of a determined signal is not necessarily optimal. In this case, how to measure a signal to determine a reported signal is an urgent problem to be solved.

SUMMARY

Implementations of the present disclosure provide a method for reporting a signal, a terminal device and a network device, which can achieve a measurement on a report quantity except an L1-RSRP to determine a reported signal.

In a first aspect, a method for reporting a signal is provided, including: determining, by a terminal device, a signal to be measured for signal measurement according to resource configuration information; measuring, by the terminal device, a first report quantity of the signal to be measured to obtain a measurement result for the first report quantity of the signal to be measured, wherein the first report quantity includes other report quantities except a Layer1-Reference Signal Receiving Power (L1-RSRP); and determining, by the terminal device, a signal required to be reported in the signal to be measured according to the measurement result for the first report quantity of the signal to be measured.

In a second aspect, a method for reporting a signal is provided, including: sending, by a network device, resource configuration information to a terminal device, wherein the resource configuration information is used for the terminal device to determine a signal to be measured for signal measurement, so as to measure a first report quantity of the signal to be measured and obtain a measurement result for the first report quantity of the signal to be measured, wherein the first report quantity includes other report quantities except a Layer1-Reference Signal Receiving Power (L1-RSRP); receiving, by the network device, a report result sent by the terminal device, wherein the report result includes information of a signal determined by the terminal device in the signal to be measured according to the measurement result for the first report quantity of the signal to be measured.

In a third aspect, a terminal device is provided, which is used for performing the method in the above first aspect or any possible implementation of the first aspect. Specifically, the terminal device includes units for performing the method of the first aspect or the method in any possible implementation of the first aspect.

In a fourth aspect, a network device is provided, which is used for performing the method in the above second aspect or any possible implementation of the second aspect. Specifically, the terminal device includes units for performing the method in the above second aspect or any possible implementation of the second aspect.

In a fifth aspect, a terminal device is provided, including a processor and a memory. The memory is configured to store a computer program, and the processor is configured to call and run the computer program stored in the memory to execute the method in the above first aspect or each implementation thereof.

In a sixth aspect, a network device is provided, including a processor and a memory. The memory is used for storing a computer program, and the processor is used for calling and running the computer program stored in the memory to execute the method in the above second aspect or each implementation thereof.

In a seventh aspect, a chip is provided, configured to implement the method in any one of the above first to second aspects or each implementation thereof.

Specifically, the chip includes a processor, configured to call and run a computer program from a memory, so that a device with which the chip is disposed performs the method in any one of the above first to second aspects or each implementation thereof.

In an eighth aspect, a computer readable storage medium is provided, configured to store a computer program, wherein the computer program causes a computer to perform the method in any one of the above first to second aspects or each implementation thereof.

In a ninth aspect, a computer program product is provided, including computer program instructions, wherein the computer program instructions cause a computer to perform the method in any one of the above first to second aspects or each implementation thereof.

In a tenth aspect, a computer program is provided, which, when being run on a computer, causes the computer to perform the method in any one of the above first to second aspects or each implementation thereof.

Based on the above technical solution, a network device may configure a terminal device with a first report quantity, wherein the first report quantity is other report quantities except an L1-RSRP, so that the terminal device may measure the first report quantity of a signal to be measured, and make signal selection according to a measurement result for the first report quantity, which is beneficial to improving flexibility of signal measurement, and make signal selection based on a measurement result for another report quantity except the L1-RSRP, which is, in some cases, beneficial to selecting a signal with a better quality and more reliable, which thus can improve system performance.

BRIEF DESCRIPTION OF DRAWINGS

FIG. 1 is a schematic diagram of architecture of a communication system according to an implementation of the present disclosure.

FIG. 2 is a schematic flow chart of a method for reporting a signal according to an implementation of the present disclosure.

FIG. 3 is a schematic diagram of a method for reporting a signal according to another implementation of the present disclosure.

FIG. 4 is a schematic block diagram of a terminal device according to an implementation of the present disclosure.

FIG. 5 is a schematic block diagram of a network device according to an implementation of the present disclosure.

DETAILED DESCRIPTION

Figure 6:
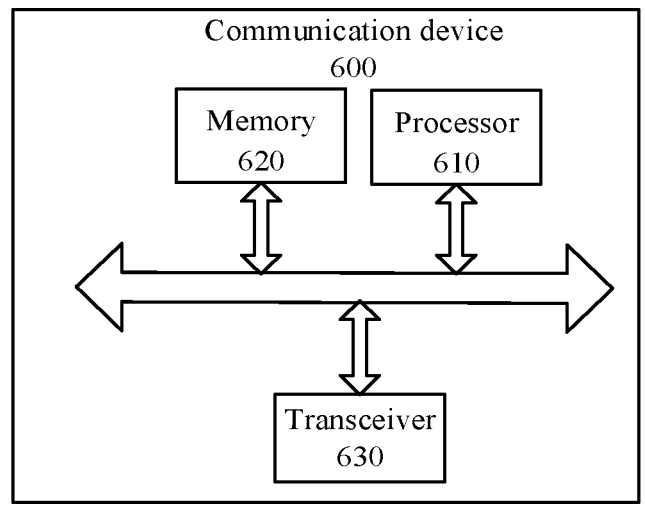
FIG. 6 is a schematic block diagram of a communication device according to an implementation of the present disclosure.

The technical solution in implementations of the present disclosure will be described below with reference to the drawings in implementations of the present disclosure. It is apparent that the implementations described are just some implementations of the present disclosure, but not all implementations of the present disclosure. According to the implementations of the present disclosure, all other implementations achieved by a person of ordinary skill in the art without paying an inventive effort are within the protection scope of the present disclosure.

The technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, or a 5G system.

Illustratively, a communication system 100 applied in an implementation of the present disclosure is shown in FIG. 1. The communication system 100 may include a network device 110, and the network device 110 may be a device that communicates with a terminal device 120 (or referred to as a communication terminal, or a terminal). The network device 110 may provide communication coverage for a specific geographical area, and may communicate with terminal devices located within the coverage area. Optionally, the network device 110 may be a Base Transceiver Station (BTS) in a GSM system or CDMA system, a NodeB (NB) in a WCDMA system, an Evolutional Node B (eNB or eNodeB) in a LTE system, or a radio controller in a Cloud Radio Access Network (CRAN), or the network device may be a network side device in a mobile switch center, a relay station, an access point, a vehicle-mounted device, a wearable device, a hub, a switch, a bridge, a router, or a 5G network, or a network device in a future evolved Public Land Mobile Network (PLMN), etc.

The communication system 100 also includes at least one terminal device 120 located within the coverage area of the network device 110. As used herein, the term "terminal device" includes, but not limited to, a device configured to connect via a wired circuit, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a Digital Video Broadcasting-Handheld (DVB-H) network, a satellite network, and an AM-FM broadcast transmitter; and/or an apparatus, of another communication terminal, configured to receive/send a communication signal; and/or an Internet of Things (IoT) device. A terminal device configured to communicate via a wireless interface may be referred to as a "wireless communication terminal", a "wireless terminal" or a "mobile terminal". Examples of the mobile terminal include, but not limited to, a satellite or cellular telephone, a Personal Communication System (PCS) terminal capable of combining with a cellular wireless telephone and data processing, faxing, and data communication abilities, a Personal Digital Assistant (PDA) that may include a radio telephone, a pager, an internet/intranet access, a Web browser, a memo pad, a calendar, and/or a Global Positioning System (GPS) receiver, and a conventional laptop and/or palmtop receiver or another electronic apparatus including a radio telephone transceiver. The terminal device may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved Public Land Mobile Network (PLMN), or the like.

Optionally, terminal direct connection (Device to Device, D2D) communication may be performed between the terminal devices 120.

Optionally, the 5G system or 5G network may be referred to as a New Radio (NR) system or a NR network.

FIG. 1 exemplifies one network device and two terminal devices. Optionally, the communication system 100 may include multiple network devices, and another quantity of terminal devices may be included within a coverage range of each network device, which is not limited by implementation of the present disclosure.

Optionally, the communication system 100 may include other network entities such as a network controller, and a mobile management entity. Implementations of the present disclosure are not limited thereto.

It should be understood that, a device with a communication function in a network/system in the implementation of the present disclosure may be referred to as a communication device. Taking the communication system 100 shown in FIG. 1 as an example, the communication device may include a network device 110 and a terminal device 120 which have communication functions, and the network device 110 and the terminal device 120 may be the specific devices described above, which will not be repeated here. The communication device may also include another device in the communication system 100, e.g., another network entity such as a network controller, a mobile management entity, etc., which is not limited by the implementation of the present disclosure.

It should be understood that the terms "system" and "network" are often used interchangeably in this document. The term "and/or" in this document is merely an association relationship describing associated objects, indicating that there may be three relationships, for example, A and/or B may indicate three cases: A alone, A and B, and B alone. In addition, the symbol "/" in this document generally indicates that objects before and after the symbol "/" have an "or" relationship.

Hereinafter, a method for reporting a signal according to an implementation of the present disclosure will be described with reference to FIGS. 2 to 3. It should be understood that FIGS. 2 to 3 show main acts or operations of the method for reporting a signal of the implementation of the present disclosure, but these acts or operations are only examples, and the implementation of the present disclosure may also perform other operations or variations of various operations of FIGS. 2 to 3. In addition, various acts in the method implementation of the present disclosure may also be performed in a different order as described in the method implementation, and it is possible that not all operations in the method implementation need to be performed.

FIG. 2 is a schematic flow chart of a method for reporting a signal according to an implementation of the present disclosure. As shown in FIG. 2, the method 200 includes following contents.

In S210, a terminal device determines a signal to be measured for signal measurement according to resource configuration information; in S220, the terminal device measures a first report quantity of the signal to be measured to obtain a measurement result for the first report quantity of the signal to be measured, wherein the first report quantity includes other report quantities except a Layer1-Reference Signal Receiving Power (L1-RSRP); and in S230, the terminal device determines a signal required to be reported in the signal to be measured according to the measurement result for the first report quantity of the signal to be measured.

Optionally, in the implementation of the present disclosure, the signal to be measured may include a Channel State Information Reference Signal (CSI-RS), or may also include all or part of signals in a Synchronization Signal Block (SSB), for example, it may include only a Secondary Synchronization Signal (SSS), or may also include an SSS and a Physical Broadcast Channel (PBCH), or include an SSS and a Demodulation Reference Signal (DMRS), etc., or may also include another downlink reference signal, which is not specifically limited in the implementation of the present disclosure.

Optionally, in the implementation of the present disclosure, the first report quantity may include other report quantities except a Layer1-Reference Signal Receiving Power (L1-RSRP), for example, a Layer1-Signal to Interference plus Noise Ratio (L1-SINR), or a Layer1-Reference Signal Receiving Quality (L1-RSRQ), or it may also include other information used for characterizing a signal quality, for example, a Layer1-Received Signal Strength Indication (L1-RSSI), etc., and the implementation of the present disclosure are not limited to this.

Specifically, the network device may configure a physical layer reporting setting for the terminal device, wherein a reporting amount indicated in the reporting setting is the first reporting amount, and the reporting setting is associated with at least one resource setting which is used for configuring a signal to be measured for signal measurement, so that, the terminal device may measure a first report quantity of the signal to be measured indicated by the at least one resource setting to obtain a measurement result for the first report quantity of the signal to be measured, and may further determine a signal required to be reported in the signal to be measured according to the measurement result for the first report quantity of the signal to be measured, for example, K signals with a best signal quality, wherein K is a positive integer.

Therefore, in the method for reporting a signal of the implementation of the present disclosure, a terminal device may measure other report quantities except an L1-RSRP, and make signal selection according to a measurement result for other report quantities, realizing flexibility of signal measurement and improving system performance.

In some scenarios, if measurement results for the L1-RSRP of the signal to be measured are not much different, or signal qualities of the signal to be measured are determined to be similar based on the measurement results for the L1-RSRP, in this case, the selection of signal made according to the measurement results for the L1-RSRP may bring a larger error, so the selection of signal made according to measurement results for other report quantities except the L1-RSRP, such as the L1-SINR or the L1-RSRQ, is beneficial to selecting a signal with a better quality and more reliability, which thus can improve system performance.

Optionally, as an implementation, if the first report quantity includes an L1-SINR or an L1-RSRQ, the S220 may include: the terminal device measures the signal to be measured to acquire information of a useful signal; the terminal device acquires corresponding information of interference and noise or total energy; the terminal device determines a measurement result for L1-SINR or L1-RSRQ of the signal to be measured according to the information of the useful signal and the information of interference and noise or the total energy.

It should be understood that the information of interference and noise may be obtained by measuring the signal to be measured, or obtained by measuring a specific resource location or a specific signal, and similarly, the total energy may also be obtained by measuring the signal to be measured, or obtained by measuring a specific resource location or a specific signal, which is not limited by the implementation of the present disclosure. That is, the signal used for determining the information of the useful signal and the signal used for determining the information of interference and noise or the total energy may be a same signal or different signals. Here, the total energy may include signals and noises of a serving cell and a same frequency cell and the like.

Further, the terminal device may determine the measurement result for L1-SINR of the signal to be measured according to the information of the useful signal and combining the information of interference and noise, or determine the measurement result for L1-RSRQ of the signal to be measured according to the information of the useful signal and combining the total energy.

It should be understood that the information of the useful signal may be a strength, a power or an energy of the useful signal, etc. In some specific implementations, the information of the useful signal may be understood as the L1-RSRP, wherein the L1-RSRP may be an average value of signal powers received on all Resource Elements (REs) carrying a reference signal within a certain symbol. The L1-SINR may refer to a ratio of the strength of the received useful signal to the strength of the received interference signal (including noise and interference). The L1-RSRQ represents a reference signal receiving quality and may be defined as N*L1-

RSRP/L1-RSSI, wherein N is a quantity of Resource Blocks (RBs) of a measurement bandwidth of the L1-RSSI. The L1-RSSI is a total received power or a total energy on all REs of one symbol within one measurement bandwidth, that is, the total energy may be the L1-RSSI.

It can be seen from this, measuring the L1-SINR requires measuring the information of the useful signal and the information of interference and noise, and measuring the L1-RSRQ requires measuring the information and the total energy of the useful signal.

The measurement method of the L1-SINR and the L1-RSRQ will be described in detail with reference to implementation 1 and implementation 2 below.

Implementation 1: the first report quantity includes an L1-SINR or an L1-RSRQ, and the resource configuration information only includes first resource configuration information, that is, the reporting setting is associated with only one resource setting, wherein the first resource configuration information indicates N first signals. In the implementation 1, the signal to be measured includes the N first signals, and the terminal device may measure each of the N first signals to determine a measurement result for the first report quantity corresponding to each signal, that is, each first signal corresponds to one measurement result. Take one of the N first signals as an example to explain the signal measurement process.

At first, S11 is performed, in which the terminal device may measure the first signal indicated by the first resource configuration information to acquire the information of the useful signal corresponding to the first signal; further, if the first report quantity is the L1-SINR, S12 is performed, in which the information of interference and noise corresponding to the first signal is acquired on a Resource Element (RE) carrying the first signal; or if the first report quantity is the L1-RSRQ, S12' is performed, in which the total energy corresponding to the first signal is acquired based on part or all of symbols carrying the first signal.

At last, S13 is performed, in which the measurement result for L1-SINR corresponding to the first signal is determined according to the information of the useful signal corresponding to the first signal and the information of interference and noise corresponding to the first signal. For example, the measurement result for L1-SINR corresponding to the first signal may be obtained by dividing the strength of the useful signal and the strength of interference and noise.

Or, the measurement result for L1-RSRQ of the first signal is determined according to the information of the useful signal corresponding to the first signal and the total energy corresponding to the first signal, for example, the measurement result for L1-SINR corresponding to the first signal may be obtained according to a formula N*L1-RSRP/L1-RSSI.

The process described in S11~S13 is performed on each of the N first signals, that is, the measurement result for L1-SINR or L1-RSRQ corresponding to each first signal may be obtained. Therefore, the terminal device may determine K signals with a best signal quality for reporting according to the measurement results for L1-SINR or L1-RSRQ corresponding to the N first signals, for example, report the measurement results for L1-SINR or L1-RSRQ of the K signals and identification information of the K signals to the network device.

It should be understood that here, the measurement result for L1-SINR may be a measurement value of L1-SINR itself, or a difference between measurement values of L1-SINR (for example, a difference relative to a specific measurement value, or a difference between measurement values, etc.), or a quantized value of a measurement value of L1-SINR, etc. The implementation of the present disclosure does not limit the reporting form of the measurement result for L1-SINR. For the measurement result for L1-RSRQ, it is similar and will not be repeated here.

It should also be understood that the identification information of the K signals may be a CSI-RS resource index and/or an SSB index. For example, if the K signals are CSI-RS, and the identification information of the K signals may be a CSI-RS resource index; or if the K signals are SSB signals, the identification information of the K signals may be the SSB index.

In the implementation of the present disclosure, a bandwidth used to acquire the information of the useful signal corresponding to the first signal is the same as RE and a bandwidth used to acquire the information of interference and noise corresponding to the first signal. That is, the bandwidths and RE used for performing S11 and S12 are the same.

Optionally, in some implementations, there may be one sending port of the first signal. In this case, the measurement result for L1-SINR or L1-RSRQ corresponding to each first signal may be obtained only through needing to sequentially perform S11~S13.

Optionally, in some other implementations, there may be multiple sending ports of the first signal. In this case, the measurement result for L1-SINR or L1-RSRQ corresponding to the first signal may be determined in following two modes. Taking determining the measurement result for L1-SINR corresponding to the first signal as an example, the measurement result for L1-RSRQ of the first signal may be determined in a similar mode, which is not repeated.

In mode 1: for each port, the above S11 to S13 are sequentially performed to determine the measurement result for L1-SINR of each port, and then the measurement result for L1-SINR corresponding to the first signal is determined according to the measurement result for L1-SINR corresponding to each port.

The specific process is as follows: firstly, the information of the useful signal corresponding to each port and the information of interference and noise corresponding to each port are determined; then, the measurement result for L1-SINR corresponding to each port is determined according to the information of the useful signal corresponding to each port and the information of interference and noise or total energy corresponding to each port.

At last, the measurement result for L1-SINR corresponding to the first signal is determined according to the measurement result for L1-SINR corresponding to each port. For example, the measurement result for L1-SINR corresponding to the first signal may be obtained by linearly superimposing the measurement result for L1-SINR corresponding to the each port, or an average value, a maximum value or a minimum value of the measurement result for L1-SINR corresponding to each port may be determined as the measurement result for L1-SINR corresponding to the first signal.

That is, for each port, S11 to S13 are sequentially performed to determine the measurement result for L1-SINR of each port, and then the average value, the maximum value or the minimum value of the measurement result for L1-SINR corresponding to each port may be determined as the measurement result for L1-SINR corresponding to the first signal.

In mode 2: the information of the useful signal corresponding to the first signal is determined according to the information of the useful signal corresponding to each port in the multiple ports, and the information of interference and noise corresponding to the first signal is determined according to the information of interference and noise corresponding to the each port, then the measurement result for L1-SINR corresponding to the first signal is determined according to the information of the useful signal corresponding to the first signal and the information of interference and noise corresponding to the first signal.

Specifically, in S11, the average value, the maximum value or the minimum value of the information of the useful signal of each port in the multiple ports may be determined as the information of the useful signal corresponding to the first signal.

In S12, the average value, the maximum value or the minimum value of the information of interference and noise of each port in the multiple ports may be determined as the information of interference and noise corresponding to the first signal.

Further, in S13, the measurement result for L1-SINR corresponding to the first signal is determined according to the information of the useful signal corresponding to the first signal and the information of interference and noise corresponding to the first signal.

Implementation 2: the first report quantity includes L1-SINR or L1-RSRQ, the resource configuration information includes first resource configuration information and second resource configuration information, the first resource configuration information is used for indicating N first signals, the signal to be measured includes the N first signals, the N is a positive integer, and the second resource configuration information is used for configuring a resource location or a second signal for interference and noise measurement or total energy measurement. Take measuring one of the N first signals as an example to explain the signal measurement process.

In the implementation 2, S21 is performed first, in which the terminal device may measure the first signal indicated by the first resource configuration information to acquire the information of the corresponding useful signal. The specific process is similar to S11 in implementation 1, and will not be repeated; further, if the first report quantity is L1-SINR, S22 is performed, in which the information of interference and noise corresponding to the first signal is acquired according to the resource location or the second signal indicated by the second resource configuration information; or if the first report quantity is L1-RSRQ, S22' is performed, in which the corresponding total energy is acquired according to the resource location or the second signal indicated by the second resource configuration information.

At last, S23 is performed, in which the measurement result for L1-SINR corresponding to the first signal is determined according to the information of the useful signal corresponding to the first signal and the corresponding information of interference and noise. For example, the measurement result for L1-SINR corresponding to the first signal may be obtained by dividing the strength of the useful signal and the strength of interference and noise. Or, the measurement result for L1-RSRQ of the first signal is determined according to the information of the useful signal corresponding to the first signal and the corresponding total energy, for example, the measurement result for L1-SINR corresponding to the first signal may be obtained according to a formula N*L1-RSRP/L1-RSSI.

Further, the process described in S21~S23 is performed on each of the N first signals, that is, the measurement result for L1-SINR or L1-RSRQ corresponding to each first signal may be obtained. Therefore, K signals with a best signal quality may be determined for reporting according to the measurement results for L1-SINR or L1-RSRQ corresponding to the N first signals, for example, the measurement results for L1-SINR or L1-RSRQ of the K signals and identification information of the K signals are reported to the network device.

It should be understood that here, the reporting form of the measurement results for L1-SINR or L1-RSRQ and the meaning of identification information of the K signals may refer to the relevant description of implementation 1, and will not be repeated here for brevity.

Optionally, in some implementations, the resource location for interference and noise measurement indicated by the second resource configuration information includes a symbol location and/or a subcarrier location, that is, the second resource configuration information may configure a time domain location, a frequency domain location and a signal and the like, for interference and noise measurement, or for total energy measurement.

Similar to implementation 1, the bandwidth used to acquire the information of the useful signal corresponding to the first signal is the same as the RE and the bandwidth used to acquire the corresponding information of interference and noise. That is, the bandwidth and the RE used for performing S21 and S22 are same.

Optionally, in some implementations, there may be one sending port for the first signal. In this case, the measurement result for L1-SINR or L1-RSRQ corresponding to each first signal may be obtained only by sequentially performing S21~S23.

Optionally, in some other implementations, there may be multiple sending ports of the first signal, the second signal used for interference and noise or total energy measurement may be one port or multiple ports, and the ports of the first signal and the second signal may have a one-to-one correspondence or a multiple-to-one correspondence, which is not limited by the implementations of the present disclosure. It is assumed that the first signal has multiple first sending ports and the second signal has at least one second sending port.

Similar to implementation 1, the terminal device may first calculate the measurement result for L1-SINR or L1-RSRQ of each port separately, and then determine the measurement result for L1-SINR or L1-RSRQ corresponding to the first signal according to the measurement result for L1-SINR or L1-RSRQ of each port. Or in S21 and S22 or S22', the information of the measured signals of multiple ports may also be directly used, and determining the measurement result for L1-SINR corresponding to the first signal is taken as an example for explanation.

For mode 1: the measurement result for L1-SINR of each port is determined, and then the measurement result for L1-SINR corresponding to the first signal is determined according to the measurement result for L1-SINR corresponding to each port.

The specific process is as follows: the information of the useful signal of each first sending port and the corresponding information of interference and noise of the second sending port are determined; then the measurement result for L1-SINR of each first sending port is determined according to the information of the useful signal of the each first sending port and the corresponding information of interference and noise or total energy of the second sending port.

Then the measurement result for L1-SINR corresponding to the first signal is determined according to the measurement result for L1-SINR of each first sending port. For example, the measurement result for L1-SINR of each first sending port may be linearly superimposed to obtain the measurement result for L1-SINR corresponding to the first signal, or an average value, a maximum value or a minimum value of the measurement result for L1-SINR of the each first sending port may be determined as the measurement result for L1-SINR corresponding to the first signal.

In mode 2: the information of the useful signal of the first signal is determined according to the information of the useful signal of each first sending port in the multiple first sending ports, and the information of interference and noise corresponding to the first signal is determined according to the information of interference and noise of the each second sending port, and then the measurement result for L1-SINR corresponding to the first signal is determined according to the information of the useful signal of the first signal and corresponding information of interference and noise.

Specifically, in S21, the average value, the maximum value or the minimum value of the information of the useful signal of each first sending port in the multiple first sending ports may be determined as the information of the useful signal of the first signal.

In S22, an average value, a maximum value or a minimum value of the information of interference and noise of each second sending port in the at least one second sending port may be determined as the corresponding information of interference and noise; further, in S23, the measurement result for L1-SINR corresponding to the first signal is determined according to the information of the useful signal of the first signal and the corresponding information of interference and noise.

Optionally, in some implementations, the signal to be measured may only include CSI-RS, or SSB, or both signals in CSI-RS and SSB. In this case, the signals in the CSI-RS and the SSB may have a one-to-one correspondence, satisfying a Quasi-co-located (QCL) relationship; or, the CSI-RS and the SSB may not satisfy the QCL relationship. for example, the CSI-RS and the SSB may come from different beams, because comparing L1-SINR with L1-RSRP, L1-SINRs of different reference signals may be directly compared to determine pros and cons of a signal quality.

Optionally, in some implementations, the method 200 further includes: the terminal device reports the signal required to be reported to the network device according to one of following modes: periodic, aperiodic, semi-persistent feedback on Physical Uplink Shared Channel (PUSCH) (semiPersistentOnPUSCH), semi-persistent feedback on Physical Uplink Control Channel (PUCCH) (semiPersistentOnPUCCH).

Optionally, in some implementations, the method 200 further includes: the terminal device receives first configuration information of the network device, wherein the first configuration information is used for configuring whether the terminal device supports signal reporting based on a beam group (i.e., groupBasedBeamReporting).

Optionally, in some implementations, the method 200 further includes: the terminal device receives second configuration information of the network device, wherein the second configuration information is used for configuring a quantity K of reported signals (i.e., nrofReportedRS).

Optionally, in some implementations, the method 200 further includes: the terminal device receives third configuration information of the network device, wherein the third configuration information is used for configuring the terminal device for broadband reporting or sub-band reporting.

The method for reporting a signal according to the implementation of the present disclosure is described in detail from the perspective of a terminal device above in combination with FIG. 2, and a method for reporting a signal according to another implementation of the present disclosure is described in detail from the perspective of a network device below in combination with FIG. 3. It should be understood that the description of the network device side corresponds to the description of the terminal device side, and the above description may be referred to for similar descriptions, which will not be repeated here to avoid repetition.

FIG. 3 is a schematic flowchart of a method 300 for reporting a signal according to another implementation of the present disclosure, and the method 300 may be performed by the network device in the communication system shown in FIG. 1. As shown in FIG. 3, the method 300 includes a following content.

In S310, the network device sends resource configuration information to the terminal device, wherein the resource configuration information is used for the terminal device to determine a signal to be measured for signal measuring to measure a first report quantity of the signal to be measured, and obtain a measurement result for the first report quantity of the signal to be measured, wherein the first report quantity includes other report quantities except a Layer 1-Reference Signal Receiving Power (L1-RSRP); the network device receives a report result sent by the terminal device, wherein the report result includes information of a signal determined by the terminal device in the signal to be measured according to the measurement result for the first report quantity of the signal to be measured.

Optionally, in some implementations, the other report quantity except the Layer 1-Reference Signal Receiving Power (L1-RSRP) is Layer 1-Signal to Interference plus Noise Ratio (L1-SINR) or Layer 1-Reference Signal Receiving Quality (L1-RSRQ).

Optionally, in some implementations, the first report quantity further includes information related to a reference signal resource identification.

Optionally, in some implementations, the information related to the reference signal resource identification includes index information of a Channel State Information Reference Signal (CSI-RS) resource and/or index information of a Synchronization Signal Block (SSB).

Optionally, in some implementations, the resource configuration information only includes first resource configuration information, wherein the first resource configuration information is used for channel measurement of L1-RSRP, L1-SINR or L1-RSRQ.

Optionally, in some implementations, the resource configuration information includes first resource configuration information and second resource configuration information, wherein a signal indicated by the first resource configuration information is used for channel measurement to determine information of a useful signal, and the second resource configuration information is used for configuring a resource location or a signal for interference and noise measurement or total energy measurement.

Optionally, in some implementations, the resource configuration information may also include more pieces of resource configuration information, such as three or more, wherein first resource configuration information in the resource configuration information is used for measuring information of a useful signal, and other resource configuration information except the first resource configuration information is used for interference and noise measurement, or total energy measurement, etc.

For example, if the resource configuration information also includes third resource configuration information, wherein the third resource configuration information is used for configuring a resource location or a signal for interference and noise measurement or total energy measurement, then the terminal device may perform interference and noise measurement or total energy measurement according to the second resource configuration information and the third resource configuration information.

Optionally, in some implementations, the signal to be measured is part or all of signals in a Channel State Information Reference Signal (CSI-RS) and/or a Synchronization Signal Block (SSB).

Optionally, in some implementations, if the signal to be measured includes signals in CSI-RS and SSB, the signals in CSI-RS and SSB correspond to each other one by one, satisfying a Quasi-co-located (QCL) relationship.

Optionally, in some implementations, if the signal includes signals in CSI-RS and SSB, the CSI-RS and the SSB do not satisfy the QCL relationship.

Optionally, in some implementations, the method 300 further includes: the network device sends first configuration information to the terminal device, wherein the first configuration information is used for configuring whether the terminal device supports signal reporting based on a beam group.

Optionally, in some implementations, the method 300 further includes: the network device sends second configuration information to the terminal device, wherein the second configuration information is used for configuring a quantity of reported signals.

Optionally, in some implementations, the method 300 further includes: the network device sends third configuration information to the terminal device, wherein the third configuration information is used for configuring the terminal device to perform broadband reporting or sub-band reporting.

Method implementations of the present disclosure are described in detail above with reference to FIGS. 2 to 3, apparatus implementations of the present disclosure are described in detail below with reference to FIGS. 4 to 8. It should be understood that the apparatus implementations and the method implementations correspond to each other, and description of the method implementations may be referred to for similar description of the apparatus implementations.

FIG. 4 shows a schematic block diagram of a terminal device 400 according to an implementation of the present disclosure. As shown in FIG. 4, the terminal device 400 includes a communicating module 610 and a determining module 620.

The determining module 410 is configured to determine a signal to be measured for signal measurement according to resource configuration information; the measuring module 420 is configured to measure a first report quantity of the signal to be measured to obtain a measurement result for the first report quantity of the signal to be measured, wherein the first report quantity includes other report quantities except a Layer1-Reference Signal Receiving Power (L1-RSRP); and the determining module 410 is further configured to determine a signal required to be reported in the signal to be measured according to the measurement result for the first report quantity of the signal to be measured.

Optionally, in some implementations, the other report quantity except the Layer1-Reference Signal Receiving Power (L1-RSRP) is Layer 1-Signal to Interference plus Noise Ratio (L1-SINR) or Layer 1-Reference Signal Receiving Quality (L1-RSRQ).

Optionally, in some implementations, the first report quantity also includes information related to a reference signal resource identification.

Optionally, in some implementations, the information related to the reference signal resource identification includes index information of a Channel State Information Reference Signal (CSI-RS) resource and/or index information of a Synchronization Signal Block (SSB).

Optionally, in some implementations, the measuring module 420 is specifically configured to measure the signal to be measured and acquire information of a useful signal; acquire corresponding information of interference and noise or total energy; the determining module 410 is further configured to determine a measurement result for L1-SINR or L1-RSRQ of the signal to be measured according to the information of the useful signal and the information of interference and noise or the total energy.

Optionally, in some implementations, the resource configuration information only includes first resource configuration information, wherein the first resource configuration information is used for indicating N first signals, and the signal to be measured includes the N first signals, wherein N is a positive integer, and the measuring module 420 is further configured to measure the first signal indicated by the first resource configuration information to acquire information of a useful signal corresponding to the first signal.

Optionally, in some implementations, the measuring module 420 is further configured to: acquire information of interference and noise corresponding to the first signal on a Resource Element (RE) carrying the first signal, if the first report quantity includes L1-SINR; or acquire a total energy corresponding to the first signal based on part or all of symbols carrying the first signal, if the first report quantity includes L1-RSRQ.

Optionally, in some implementations, the determining module 410 is specifically configured to: determine a measurement result for L1-SINR corresponding to the first signal according to the information of the useful signal corresponding to the first signal and the information of interference and noise corresponding to the first signal; or determine a measurement result for L1-RSRQ corresponding to the first signal according to the information of the useful signal corresponding to the first signal and the total energy corresponding to the first signal.

Optionally, in some implementations, there is one sending port for the first signal.

Optionally, in some implementations, there are multiple sending ports for the first signal, and the determining module 410 is specifically configured to determine information of a useful signal corresponding to each port in multiple ports and information of interference and noise corresponding to the each port; determine the measurement result for L1-SINR or L1-RSRQ corresponding to the each port according to the information of the useful signal corresponding to the each port and the information of interference and noise or total energy corresponding to the each port; and determine an average value, a maximum value or a minimum value of the measurement result for L1-SINR or L1-RSRQ corresponding to the each port as the measurement result for L1-SINR or L1-RSRQ corresponding to the first signal.

Optionally, in some implementations, there are multiple sending ports for the first signal, and the determining module 410 is specifically configured to determine information of the useful signal corresponding to each port in multiple ports, and determine an average value, a maximum value or a minimum value in the information of the useful signal corresponding to each port in the multiple ports as the information of the useful signal corresponding to the first signal; determine information of interference and noise or total energy corresponding to the each port, and determine an average value, a maximum value or a minimum value in the information of interference and noise or the total energy corresponding to the each port in the multiple ports as the information or the total energy of interference and noise corresponding to the first signal; determine the measurement result for L1-SINR or L1-RSRQ corresponding to the first signal according to the information of the useful signal corresponding to the first signal and the information of interference and noise or the total energy corresponding to the first signal.

Optionally, in some implementations, a bandwidth used to acquire the information of the useful signal corresponding to the first signal is the same as RE and a bandwidth used to acquire the information of interference and noise corresponding to the first signal.

Optionally, in some implementations, the total energy corresponding to the first signal includes an energy of signal and noise of a serving cell and a same frequency cell.

Optionally, in some implementations, if only one piece of resource configuration information is configured on the terminal device, the one piece of resource configuration information is used for channel measurement of L1-RSRP, L1-SINR or L1-RSRQ.

Optionally, in some implementations, the resource configuration information includes first resource configuration information and second resource configuration information, the first resource configuration information is used for indicating N first signals, the signal to be measured includes the N first signals, the N is a positive integer, and the second resource configuration information is used for configuring a resource location or a second signal for interference and noise measurement or total energy measurement.

Optionally, in some implementations, the measuring module 420 is further configured to measure the first signal indicated by the first resource configuration information to acquire the information of the useful signal corresponding to the first signal.

Optionally, in some implementations, the measuring module 420 is further configured to: acquire the corresponding information of interference and noise according to the resource location or the second signal indicated by the second resource configuration information, if the first report quantity contains L1-SINR; or acquire the corresponding total energy according to the resource location or the second signal indicated by the second resource configuration information, if the first report quantity contains L1-RSRQ.

Optionally, in some implementations, a bandwidth used to acquire the useful signal corresponding to the first signal is the same as RE and a bandwidth used to acquire the information of interference and noise.

Optionally, the total energy includes an energy of signal and noise of a serving cell and a same frequency cell.

Optionally, in some implementations, the determining module 410 is further configured to: determine a measurement result for L1-SINR corresponding to the first signal according to the information of the useful signal corresponding to the first signal and the information of interference and noise; or determine a measurement result for L1-RSRQ corresponding to the first signal according to the information of the useful signal corresponding to the first signal and the total energy.

Optionally, in some implementations, the resource location for interference and noise measurement includes a symbol location and/or a subcarrier location for interference and noise measurement.

Optionally, in some implementations, the resource configuration information further includes third resource configuration information, wherein the third resource configuration information is used for configuring a resource location or a third signal for interference and noise measurement.

Optionally, in some implementations, there is one sending port for the first signal and the second signal.

Optionally, in some implementations, the sending port of the first signal is multiple first sending ports, the sending port of the second signal is at least one second sending port, and the determining module 410 is specifically configured to: determine information of a useful signal corresponding to each of the multiple first sending ports and information of interference and noise or a total energy corresponding to each second sending port; determine a measurement result for L1-SINR or L1-RSRQ of the each first sending port according to the information of the useful signal of each first sending port and the corresponding information of interference and noise or total energy of the second sending port; determine an average value, a maximum value or a minimum value of the measurement result for L1-SINR or L1-RSRQ corresponding to each first sending port as the measurement result for L1-SINR or L1-RSRQ corresponding to the first signal.

Optionally, in some implementations, the sending port of the first signal is multiple first sending ports, the sending port of the second signal is at least one second sending port, and the determining module 410 is specifically configured to: determine information of a useful signal of each of the multiple first sending ports, and determine an average value, a maximum value or a minimum value in the information of the useful signal of each of the multiple first sending ports as the information of the useful signal corresponding to the first signal; determine information of interference and noise or a total energy of the each second sending port, and determine an average value, a maximum value or a minimum value in the information of interference and noise or the total energy of each second sending port in the at least one second sending port as the corresponding information of interference and noise or total energy; determine the measurement result for L1-SINR or L1-RSRQ corresponding to the first signal according to the information of the useful signal corresponding to the first signal and the corresponding information of interference and noise or total energy.

Optionally, in some implementations, if the signal to be measured includes signals in CSI-RS and SSB, the signals in CSI-RS and SSB correspond to each other one by one, satisfying a Quasi-co-located (QCL) relationship.

Optionally, in some implementations, if the signal to be measured includes signals in CSI-RS and SSB, the CSI-RS and the SSB do not satisfy the QCL relationship.

Optionally, in some implementations, the terminal device further includes: a communicating module, configured to report the signal required to be reported to the network device according to one of following modes: periodically or aperiodically, feeding back semi-continuously on a Physical Uplink Shared Channel (PUSCH), and feeding back semi-continuously on a Physical Uplink Control Channel (PUCCH).

Optionally, in some implementations, the terminal device further includes a communicating module, configured to receive first configuration information of the network device, wherein the first configuration information is used for configuring whether the terminal device supports signal reporting based on a beam group.

Optionally, in some implementations, the terminal device further includes a communicating module, configured to receive second configuration information of the network device, wherein the second configuration information is used for configuring a quantity of reported signals.

Optionally, in some implementations, the terminal device further includes a communicating module, configured to receive third configuration information of the network device, wherein the third configuration information is used for configuring the terminal device to perform broadband reporting or subband reporting.

Specifically, the terminal device 400 may correspond to (e.g., may be configured in or be itself) the terminal device described in the method 200, and various modules or units in the terminal device 400 are respectively used for executing various actions or processes performed by the network device in the method 200. Herein, in order to avoid redundancy, detailed description thereof is omitted.

FIG. 5 is a schematic block diagram of a network device according to an implementation of the present disclosure. A network device 500 in FIG. 5 includes a determining module 510 and a communicating module 520.

The communicating module 510 is configured to send resource configuration information to a terminal device, wherein the resource configuration information is used for the terminal device to determine a signal to be measured for signal measuring to measure a first report quantity of the signal to be measured, and obtain a measurement result for the first report quantity of the signal to be measured, wherein the first report quantity includes other report quantities except a Layer 1-Reference Signal Receiving Power (L1-RSRP); as well as receive a report result sent by the terminal device, wherein the report result includes information of a signal determined by the terminal device in the signal to be measured according to the measurement result for the first report quantity of the signal to be measured.

Optionally, in some implementations, the other report quantity except the Layer 1-Reference Signal Receiving Power (L1-RSRP) is Layer 1-Signal to Interference plus Noise Ratio (L1-SINR) or Layer 1-Reference Signal Receiving Quality (L1-RSRQ).

Optionally, in some implementations, the first report quantity further includes information related to a reference signal resource identification.

Optionally, in some implementations, the information related to the reference signal resource identification includes index information of a Channel State Information Reference Signal (CSI-RS) resource and/or index information of a Synchronization Signal Block (SSB).

Optionally, in some implementations, the resource configuration information only includes first resource configuration information, wherein the first resource configuration information is used for channel measurement of L1-RSRP, L1-SINR or L1-RSRQ.

Optionally, in some implementations, the resource configuration information includes first resource configuration information and second resource configuration information, wherein a signal indicated by the first resource configuration information is used for channel measurement to determine information of a useful signal, and the second resource configuration information is used for configuring a resource location or a signal for interference and noise measurement or total energy measurement.

Optionally, in some implementations, the resource configuration information further includes third resource configuration information, wherein the third resource configuration information is used for configuring the resource location or the signal for interference and noise measurement or total energy measurement.

Optionally, in some implementations, the signal to be measured is part or all of signals in a Channel State Information Reference Signal (CSI-RS) and/or a Synchronization Signal Block (SSB).

Optionally, in some implementations, if the signal to be measured includes signals in CSI-RS and SSB, the signals in CSI-RS and SSB correspond to each other one by one, satisfying a Quasi-co-located (QCL) relationship.

Optionally, in some implementations, if the signal includes signals in CSI-RS and SSB, the CSI-RS and the SSB do not satisfy the QCL relationship.

Optionally, in some implementations, the communicating module 510 is further configured to send first configuration information to the terminal device, wherein the first configuration information is used for configuring whether the terminal device supports signal reporting based on a beam group.

Optionally, in some implementations, the communicating module 510 is further configured to send second configuration information to the terminal device, wherein the second configuration information is used for configuring a quantity of reported signals.

Optionally, in some implementations, the communicating module 510 is further configured to send third configuration information to the terminal device, wherein the third configuration information is used for configuring the terminal device to perform broadband reporting or sub-band reporting.

Specifically, the network device 500 may correspond to (e.g., may be configured in or be itself) the network device described in the method 300, and various modules or units in the network device 500 are respectively used for executing various actions or processes performed by the network device in the method 300. Herein, in order to avoid redundancy, detailed description thereof is omitted.

FIG. 6 is a schematic structural diagram of a communication device 600 according to an implementation of the present disclosure. The communication device 600 shown in FIG. 6 includes a processor 610. The processor 610 may call and run a computer program from a memory to implement the method in the implementation of the present disclosure.

Optionally, as shown in FIG. 6, the communication device 600 may further include a memory 620. The processor 610 may call and run a computer program from the memory 620 to implement the method in the implementation of the present disclosure.

The memory 620 may be a separate device independent of the processor 610 or may be integrated in the processor 610.

Optionally, as shown in FIG. 6, the communication device 600 may further include a transceiver 630, and the processor 610 may control the transceiver 630 to communicate with another device. Specifically, information or data may be sent to another device, or information or data sent by another device is received.

The transceiver 630 may include a transmitter and a receiver. The transceiver 630 may further include antennas, and the quantity of antennas may be one or more.

Optionally, the communication device 600 may specifically be a network device of the implementation of the present disclosure, and the communication device 600 may implement corresponding processes implemented by the network device in various methods of the implementations of the present disclosure, which will not be repeated here for brevity.

Optionally, the communication device 600 may be specifically a mobile terminal/terminal device of the implementation of the present disclosure, and the communication device 600 may implement corresponding processes implemented by the mobile terminal/terminal device in various methods of the implementation of the present disclosure, which will not be repeated here for brevity.

Figure 7:
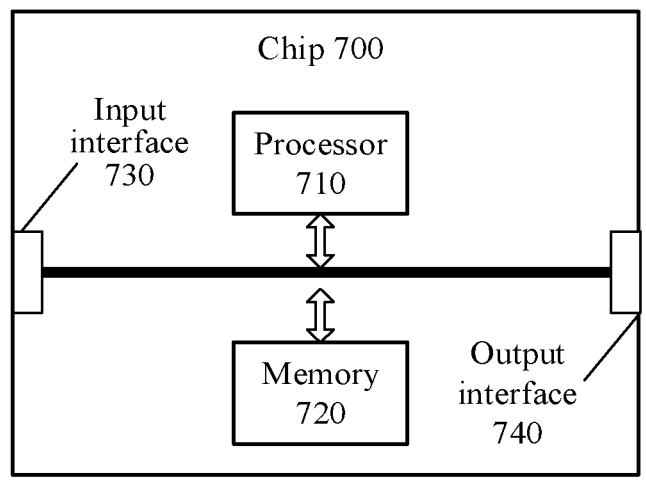
FIG. 7 is a schematic block diagram of a chip according to an implementation of the present disclosure.

FIG. 7 is a schematic diagram of a structure of a chip of an implementation of the present disclosure. A chip 700 shown in FIG. 7 includes a processor 710. The processor 710 may call and run a computer program from a memory to implement the method in the implementation of the present disclosure.

Optionally, as shown in FIG. 7, the chip 700 may further include a memory 720. The processor 710 may call and run a computer program from the memory 720 to implement the method in the implementation of the present disclosure.

The memory 720 may be a separate device independent of the processor 710 or may be integrated in the processor 710.

Optionally, the chip 700 may further include an input interface 730. The processor 710 may control the input interface 730 to communicate with other devices or chips. Specifically, the processor 710 may acquire information or data sent by other devices or chips.

Optionally, the chip 700 may further include an output interface 740. The processor 710 may control the output interface 740 to communicate with other devices or chips. Specifically, the processor 710 may output information or data to other devices or chips.

Optionally, the chip may be applied in a network device of the implementation of the present disclosure, and the chip may implement the corresponding processes implemented by the network device in various methods of the implementation of the present disclosure, which will not be repeated here for brevity.

Optionally, the chip may be applied in a mobile terminal/terminal device of the implementation of the present disclosure, and the chip may implement the corresponding processes implemented by the mobile terminal/terminal device in the various methods of the implementation of the present disclosure, which will not be repeated here for brevity.

It should be understood that the chip mentioned in the implementation of the present disclosure may be referred to as a system-level chip, a system chip, a chip system or a system-on-chip, etc.

Figure 8:
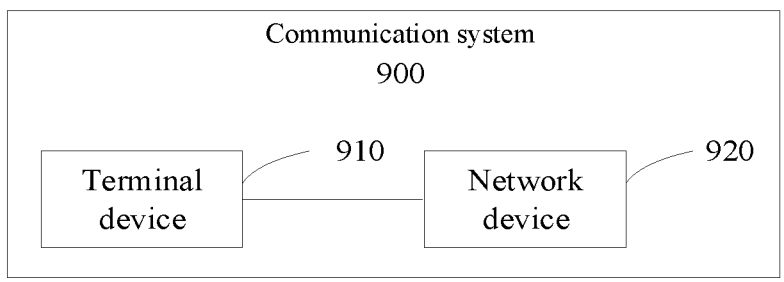
FIG. 8 is a schematic block diagram of a communication system according to an implementation of the present disclosure.

FIG. 8 is a schematic block diagram of a communication system 900 according to an implementation of the present disclosure. As shown in FIG. 8, the communication system 900 may include a terminal device 910 and a network device 920.

Herein, the terminal device 910 may be configured to implement the corresponding functions implemented by the terminal device in the above-mentioned method, and the network device 920 may be configured to implement the corresponding functions implemented by the network device in the above-mentioned method, which will not be repeated here for brevity.

It should be understood that, the processor in the implementation of the present disclosure may be an integrated circuit chip having a signal processing capability. In an implementation process, the acts of the foregoing method implementations may be implemented by using an integrated logic circuit of hardware in the processor or instructions in a form of software. The processor may be a general purpose processor, a digital signal processor (Digital Signal Processing, DSP), an application specific integrated circuit (Application Specific Integrated Circuit, ASIC), a field programmable gate array (Field Programmable Gate Array, FPGA) or another programmable logic device, a discrete gate or a transistor logic device, or a discrete hardware component. The processor may implement or perform methods, acts and logical block diagrams disclosed in the implementation of the present disclosure. The general purpose processor may be a microprocessor, or the processor may be any conventional processor or the like. The acts of the method disclosed with reference to the implementation of the present disclosure may be directly implemented by a hardware decoding processor, or may be implemented by a combination of hardware and software modules in the decoding processor. The software modules may be located in a storage medium commonly used in the art, such as a random access memory, a flash memory, a read-only memory, a programmable read-only memory or an electrically erasable programmable memory, or a register. The storage medium is located in the memory, and the processor reads the information in the memory and completes the acts of the above method in combination with its hardware.

It may be understood that, the memory in the implementation of the present disclosure may be a transitory memory or a non-transitory memory, or may include both a transitory memory and a non-transitory memory. The non-transitory memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The transitory memory may be a random access memory (Random Access Memory, RAM), and is used as an external cache. Through exemplary but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM), and a direct rambus dynamic random access memory (Direct Rambus RAM, DR RAM). It should be noted that the memory in the systems and methods described in this specification is aimed at including but being not limited to these and any memory of another proper type.

It should be understood that, the foregoing memory is an example for illustration and should not be construed as limiting. For example, optionally, the memory in the implementations of the present disclosure may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Direct Rambus DRAM (DR RAM), or the like. That is, memories in the implementations of the present disclosure are intended to include, but are not limited to, these and any other suitable types of memories.

An implementation of the present disclosure further provides a computer readable storage medium configured to store a computer program.

Optionally, the computer readable storage medium may be applied in a network device of the implementation of the present disclosure, and the computer program causes a computer to perform corresponding processes implemented by the network device in various methods of the implementations of the present disclosure, which will not be repeated here for brevity.

Optionally, the computer readable storage medium may be applied in a mobile terminal/terminal device of the implementation of the present disclosure, and the computer program causes a computer to perform corresponding processes implemented by the mobile terminal/terminal device in various methods of the implementations of the present disclosure, which will not be repeated here for brevity.

An implementation of the present disclosure also provides a computer program product including computer program instructions.

Optionally, the computer program product may be applied in a network device of the implementation of the present disclosure, and the computer program instructions cause a computer to perform corresponding processes implemented by the network device in various methods of the implementations of the present disclosure, which will not be repeated here for brevity.

Optionally, the computer program product may be applied in a mobile terminal/terminal device of the implementation of the present disclosure, and the computer program instructions cause a computer to perform corresponding processes implemented by the mobile terminal/terminal device in various methods according to the implementation of the present disclosure, which will not be repeated here for brevity.

An implementation of the present disclosure also provides a computer program.

Optionally, the computer program may be applied in a network device of the implementation of the present disclosure. When the computer program is run on a computer, the computer is caused to perform corresponding processes implemented by the network device in various methods of the implementations of the present disclosure, which will not be repeated here for brevity.

Optionally, the computer program may be applied in a mobile terminal/terminal device of the implementation of the present disclosure. When the computer program is run on a computer, the computer is caused to perform corresponding processes implemented by the mobile terminal/terminal device in various methods of the implementation of the present disclosure, which will not be repeated here for brevity.

Those of ordinary skill in the art will recognize that the exemplary elements and algorithm acts described in combination with the implementations disclosed herein may be implemented in electronic hardware, or a combination of computer software and electronic hardware. Whether these functions are implemented in hardware or software depends on the specific application and design constraints of the technical solution. Skilled artisans may use different methods to implement the described functions in respect to each particular application, but such implementation should not be considered to be beyond the scope of the present disclosure.

Those skilled in the art may clearly understand that for convenience and conciseness of description, the specific working processes of the systems, apparatuses and units described above may refer to the corresponding processes in the method implementations and will not be described here.

In several implementations provided by the present disclosure, it should be understood that the disclosed systems, apparatuses and methods may be implemented in other modes. For example, the apparatus implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the implementations.

In addition, various functional units in various implementations of the present disclosure may be integrated in one processing unit, or the various units may be physically present separately, or two or more units may be integrated in one unit.

The functions may be stored in a computer readable storage medium if realized in a form of software functional units and sold or used as a separate product. Based on this understanding, the technical solution of the present disclosure, in essence, or the part contributing to the prior art, or the part of the technical solution, may be embodied in the form of a software product stored in a storage medium, including a number of instructions for causing a computer device (which may be a personal computer, a server, or a network device and the like) to perform all or part of the acts of the method described in various implementations of the present disclosure.

The foregoing storage medium includes: any medium that may store program code, such as a USB flash drive, a removable hard disk, a read-only memory (Read-Only Memory, ROM), a random access memory (Random Access Memory, RAM), a magnetic disk, or an optical disc.

What are described above are merely exemplary implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be determined by the protection scope of the claims.

What is claimed is:

1. A method for reporting a signal, comprising:
   determining, by a terminal device, one or more signals to be measured for signal measurement according to resource configuration information received from a network device;
   measuring, by the terminal device, a first report quantity of the signals to be measured to obtain a measurement result for the first report quantity of the signals to be measured, wherein the first report quantity comprises Layer 1-Signal to Interference plus Noise Ratio (L1-SINR); and
   determining, by the terminal device, one or more signals required to be reported in the signals to be measured according to the measurement result for the first report quantity of the signals to be measured, wherein measuring, by the terminal device, the first report quantity of the signals to be measured to obtain the measurement result for the first report quantity of the signals to be measured, comprises:

measuring, by the terminal device, the signals to be measured to acquire information of a useful signal;

acquiring, by the terminal device, information of interference and noise or a total received energy;

determining, by the terminal device, a measurement result for L1-SINR of the signals to be measured according to the information of the useful signal and the information of the interference and noise or the total received energy, wherein in a condition that the resource configuration information only comprises first resource configuration information, the first resource configuration information is used for indicating N first signals, and the signals to be measured comprises the N first signals, wherein N is a positive integer, and measuring, by the terminal device, the signals to be measured to acquire the information of the useful signal, comprises: measuring, by the terminal device, the first signal indicated by the first resource configuration information to acquire the information of the useful signal corresponding to the first signal, acquiring, by the terminal device, the information of interference and noise or total energy, comprises: acquiring, by the terminal device, information of interference and noise corresponding to the first signal on one or more Resource Elements (REs) carrying the first signal, wherein in a condition that the resource configuration information comprises first resource configuration information and second resource configuration information, the first resource configuration information is used for indicating N first signals, the signals to be measured comprises the N first signals, the N is a positive integer, and the second resource configuration information is used for configuring a resource location or a second signal for interference and noise measurement or total energy measurement, measuring, by the terminal device, the signals to be measured to acquire the information of the useful signal, comprises: measuring, by the terminal device, the first signal indicated by the first resource configuration information to acquire the information of the useful signal corresponding to the first signal, acquiring, by the terminal device, the information of interference and noise or total energy, comprises: acquiring, by the terminal device, the information of interference and noise according to the resource location or the second signal indicated by the second resource configuration information.

2. The method according to claim 1, wherein the first report quantity further comprises information related to a reference signal resource identification.

3. The method according to claim 2, wherein the information related to the reference signal resource identification comprises index information of a Channel State Information Reference Signal (CSI-RS) resource and/or index information of a Synchronization Signal Block (SSB).

4. The method according to claim 1, wherein determining, by the terminal device, the measurement result for L1-SINR of the signals to be measured according to the information of the useful signal and the information of interference and noise or the total energy, comprises:

determining, by the terminal device, a measurement result for L1-SINR corresponding to the first signal according to the information of the useful signal corresponding to the first signal and the information of interference and noise corresponding to the first signal.

5. A terminal device, comprising:

a processor, configured to determine one or more signals to be measured for signal measurement according to resource configuration information received from a network device; configured to measure a first report quantity of the signals to be measured to obtain a measurement result for the first report quantity of the signals to be measured, wherein the first report quantity comprises Layer 1-Signal to Interference plus Noise Ratio (L1-SINR); and wherein the processor is further configured to determine one or more signals required to be reported in the signals to be measured according to the measurement result for the first report quantity of the signals to be measured, wherein the processor is further configured to measure the signals to be measured to acquire information of a useful signal; acquire information of interference and noise or a total received energy; determine a measurement result for L1-SINR of the signals to be measured according to the information of the useful signal and the information of interference and noise or the total received energy, wherein in a condition that the resource configuration information only comprises first resource configuration information, the first resource configuration information is used for indicating N first signals, and the signals to be measured comprises the N first signals, wherein N is a positive integer, and the processor is further configured to: measure the first signal indicated by the first resource configuration information to acquire the information of the useful signal corresponding to the first signal; acquire information of interference and noise corresponding to the first signal on a Resource Element (RE) carrying the first signal;

wherein in a condition that the resource configuration information comprises first resource configuration information and second resource configuration information, the first resource configuration information is used for indicating N first signals, the signals to be measured comprises the N first signals, the N is a positive integer, and the second resource configuration information is used for configuring a resource location or a second signal for interference and noise measurement or total energy measurement, the processor is further configured to: measure the first signal indicated by the first resource configuration information to acquire the information of the useful signal corresponding to the first signal; acquire the information of interference and noise according to the resource location or the second signal indicated by the second resource configuration information.

6. The terminal device according to claim 5, wherein there are a plurality of sending ports for the first signal, the processor is specifically configured to:

determine information of a useful signal corresponding to each port in a plurality of ports and information of interference and noise corresponding to the each port;

determine the measurement result for L1-SINR corresponding to the each port according to the information of the useful signal corresponding to the each port and the information of the interference and noise or total energy corresponding to the each port; and determine an average value, a maximum value or a minimum value of the measurement result for L1-SINR corresponding to the each port as the measurement result for L1-SINR corresponding to the first signal.

7. The terminal device according to claim 5, wherein there are a plurality of sending ports for the first signal, the processor is specifically configured to:

determine information of a useful signal corresponding to each port in a plurality of ports, and determine an average value, a maximum value or a minimum value in the information of the useful signal corresponding to each port in the plurality of ports as the information of the useful signal corresponding to the first signal;

determine information of interference and noise or total energy corresponding to the each port, and determine an average value, a maximum value or a minimum value in the information of interference and noise or the total energy corresponding to the each port in the plurality of ports as the information of interference and noise or the total energy corresponding to the first signal;

determine the measurement result for L1-SINR corresponding to the first signal according to the information of the useful signal corresponding to the first signal and the information of interference and noise or the total energy corresponding to the first signal.

8. The terminal device according to claim 5, wherein the processor is further configured to:

determine a measurement result for L1-SINR corresponding to the first signal according to the information of the useful signal corresponding to the first signal and the information of interference and noise.

9. The terminal device according to claim 5, wherein the sending port of the first signal comprises a plurality of first sending ports, the sending port of the second signal is at least one second sending port, and the processor is specifically configured to:

determine information of a useful signal corresponding to each of the plurality of first sending ports and information of interference and noise or a total energy corresponding to each second sending port;

determine a measurement result for L1-SINR of the each first sending port according to the information of the useful signal of each first sending port and the corresponding information of interference and noise or the total energy of the second sending port;

determine an average value, a maximum value or a minimum value of the measurement result for L1-SINR corresponding to each first sending port as the measurement result for L1-SINR corresponding to the first signal.

10. The terminal device according to claim 5, wherein the sending port of the first signal comprises a plurality of first sending ports, the sending port of the second signal is at least one second sending port, and the processor is specifically configured to:

determine information of a useful signal of each of the plurality of first sending ports, and determine an average value, a maximum value or a minimum value in the information of the useful signal of each of the plurality of first sending ports as the information of the useful signal corresponding to the first signal;

determine information of interference and noise or a total energy of the each second sending port, and determine an average value, a maximum value or a minimum value in the information of interference and noise or the total energy of each second sending port in the at least one second sending port as the corresponding information of interference and noise or the total energy;

determine the measurement result for L1-SINR corresponding to the first signal according to the information of the useful signal corresponding to the first signal and the corresponding information of interference and noise or the total energy.

* * * * *